US010038729B1

(12) United States Patent
Ramalingam et al.

(10) Patent No.: US 10,038,729 B1
(45) Date of Patent: Jul. 31, 2018

(54) COOPERATIVE NETWORK ACCESS

(71) Applicant: AMAZON TECHNOLOGIES, INC., Reno, NV (US)

(72) Inventors: Harsha Ramalingam, Kirkland, WA (US); Jesper Mikael Johansson, Redmond, WA (US); Bhavnish H. Lathia, Redmond, WA (US)

(73) Assignee: Amazon Technologies, Inc., Reno, NV (US)

(*) Notice: Subject to any disclaimer, the term of this patent is extended or adjusted under 35 U.S.C. 154(b) by 306 days.

(21) Appl. No.: 14/094,633

(22) Filed: Dec. 2, 2013

Related U.S. Application Data

(60) Provisional application No. 61/866,292, filed on Aug. 15, 2013.

(51) Int. Cl.
*H04L 9/06* (2006.01)
*H04L 29/06* (2006.01)

(52) U.S. Cl.
CPC .................. *H04L 65/1069* (2013.01)

(58) Field of Classification Search
CPC ..... H04W 4/003; H04W 4/001; H04W 88/04; H04W 72/10; H04W 88/02; H04L 65/1069
See application file for complete search history.

(56) References Cited

U.S. PATENT DOCUMENTS

| 8,155,081 B1* | 4/2012 | Mater ...................... H04W 4/04 370/254 |
| 8,588,130 B2* | 11/2013 | Stewart et al. ......... H04L 12/14 |
| 2003/0224799 A1* | 12/2003 | Squibbs ................ H04W 40/18 455/450 |
| 2004/0249905 A1* | 12/2004 | Wilcock et al. ........ G06Q 30/02 |
| 2007/0147324 A1* | 6/2007 | McGary ................ H04L 43/062 |
| 2008/0101367 A1* | 5/2008 | Weinman ................ H04L 45/00 370/392 |
| 2010/0303006 A1* | 12/2010 | Fernandez Gutierrez ................ H04L 63/12 |
| 2011/0154041 A1* | 6/2011 | Godfrey ................ H04W 12/04 713/171 |
| 2011/0294502 A1* | 12/2011 | Oerton .................. H04W 4/001 455/426.1 |
| 2013/0304631 A1* | 11/2013 | Wang ..................... G06Q 20/12 705/39 |
| 2013/0322401 A1 | 12/2013 | Visuri et al. |
| 2014/0207676 A1* | 7/2014 | van Wel ............. H04L 12/1435 705/44 |

* cited by examiner

*Primary Examiner* — Chris Parry
*Assistant Examiner* — Soe M Hlaing
(74) *Attorney, Agent, or Firm* — Lindauer Law, PLLC

(57) ABSTRACT

One or more cooperative network servers establish connections with a plurality of access points to form a cooperative network. The plurality of access points may be operated by a plurality of different individuals. Incentives such as reciprocal usage, remuneration, and so forth may encourage participants to join the cooperative network. Data may be passed from an originating device through the access point to a datacenter, which may transfer the data to another datacenter which sends the data to another access point which ultimately provides the data to a destination device. The transfer between datacenters may use a high capacity backbone which may provide lower latency, reduced data transfer cost, and so forth.

20 Claims, 10 Drawing Sheets

| ACCOUNT DATA 124 ||||||
| --- | --- | --- | --- | --- |
| ACCOUNT ID 202 | ACCESS POINT ID 204 | GEOLOCATION 206 | OTHER DATA 208 | INCENTIVE PROGRAM 210 |
| Alice | 104(1) | N 30.51, W 97.75 | 802.11(N, B, G), < 0.5 Mbps, no QoS | R11 |
| Alice | 104(2) | N 30.50, W 97.75 | 802.11(N), < 0.75 Mbps, QoS supported | R11 |
| Bob | 104(3) | N 30.49, W 97.77 | 802.11(G), < 1.5 Mbps | C78 |
| Charlie | 104(4) | N 30.51, W 97.76 | 802.11(N, G), < 3.5 Mbps, available 6 a.m. to 6 p.m. local Weekdays | T29 |
| Dina | 104(5) | N 30.52, W 97.81 | 802.11(A, N), < 1.9 Mbps, QoS supported | R11 |
| Evelyn | none | none | none | C72 |

| USAGE DATA 126 | | | | |
|---|---|---|---|---|
| ACCOUNT ID 202 | USED (GB) 302 | PROVIDED (GB) 304 | TRANSFER BALANCE ($) 306 | DATA TRANSFER ALLOWED? 308 |
| Alice | 1.2 | 3.1 | +$10.14 | Yes |
| Bob | 2.4 | 2.4 | N/A | Yes |
| Charlie | 5.1 | 15.7 | N/A | Yes |
| Dina | 0.5 | 0 | $0.00 | No |
| Evelyn | 7.7 | 0 | -$19.95 | Yes |
| ⋮ | | | | |

FIG. 3

Welcome to the Cooperative Network Configuration

402 —

404 — Administrator: John Smith    Account ID: JSmith2931

406 — Current incentive program: Reciprocal Usage ("R11")    [More]

Access Points Participating in Cooperative Network:

| Wireless MAC Address | Friendly Name |
|---|---|
| 55 53 52 31 30 32 | Waiting Room |
| 49 4e 54 32 33 41 | Front Exterior |
| 33 43 4f 31 41 33 | Loading Dock |

[Add/Remove]

408 — Support Quality of Service (QoS) flagging and prioritization? ☑

410 — Private SSID(s): "mybusiness"    [Add/Remove]

412 — Set time of day restrictions?    [More]

414 —

416 — Set day of week restrictions?    [More]

418 — You are currently committed to provide 500 kbps of bandwidth to the cooperative network.    [Modify]

420 — Amount of available bandwidth (above commitment) to share with Cooperative users    0%  ———  100%

Your access points support the "High Security" segment.

COOPERATIVE NETWORK ACCESS

PRIORITY

This application claims priority to U.S. Provisional Patent Application Ser. No. 61/866,292 filed on Aug. 15, 2013, entitled "Cooperative Network Access." The entirety of this previously filed application is hereby incorporated by reference.

BACKGROUND

A wide variety of user devices use networks to access a large array of services ranging from online shopping to content distribution and more. These user devices may include televisions, tablet computers, personal computers, electronic book readers, gaming consoles, set-top boxes, media players, in-vehicle entertainment systems, smartphones, desktop computers, and so forth.

BRIEF DESCRIPTION OF DRAWINGS

FIG. 2 is a diagram of the account data.

FIG. 3 is a diagram of the usage data.

FIG. 4 is an illustrative user interface for configuring participation in a cooperative network.

Figure 1A:
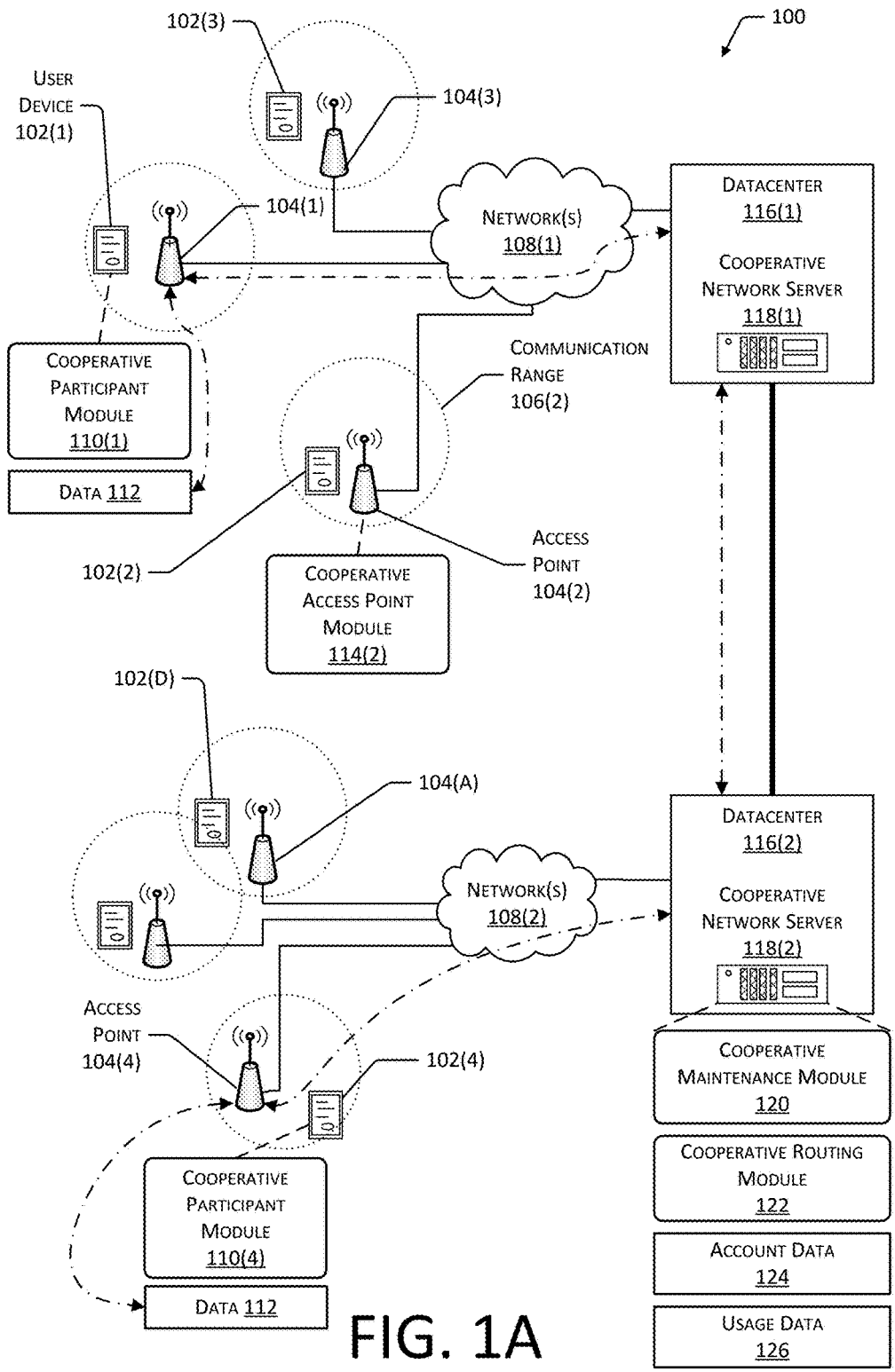
FIG. 1A is an illustrative system of providing cooperative network access based on a plurality of access points defined in account data and usage data.

Certain implementations and embodiments will now be described more fully below with reference to the accompanying figures, in which various aspects are shown. However, various aspects may be implemented in many different forms and should not be construed as limited to the implementations set forth herein. Like numbers refer to like elements throughout.

DETAILED DESCRIPTION

A wide variety of user devices have wireless network capabilities which allow those user devices to ultimately connect to networks, such as the Internet. Using these wireless networks, the user devices are able to access a wide variety of information and services, such as online databases, merchants, and so forth. Wireless networks may be relatively long range in that they operate over distances exceeding 300 meters in typical use scenarios, such as wireless wide area network ("WWAN") technologies including 3G, 4G, LTE, and so forth. Because of the frequencies used, power levels involved in transmission, mitigation of interference, historical factors, and so forth, the installation and operation of radio transmitters associated with these WWANs typically requires licensing by governmental entities. For example, installation of a WWAN radio transmitter in the United States requires applying for and maintaining a license with the Federal Communications Commission (F.C.C.) in the United States. As a result, installation and operation of WWANs are traditionally maintained by large entities such as telecommunication carriers which operate at a regional or national level.

In comparison, some relatively short range wireless networks such as wireless local area networks ("WLANs") operating at relatively shorter distances, at lower power levels, and so forth, are subject to much less stringent regulatory requirements. For example, communication using the one or more of an 802.11 family of standards promulgated by the Institute of Electrical and Electronics Engineers ("IEEE") (also known as "Wi-Fi™") use various frequencies including but not limited to the 2.4 Gigahertz ("GHz") and 5.8 GHz Industrial Scientific and Medical ("ISM") bands. The ISM bands allow for unlicensed operation within certain technical constraints. The 802.11 family of standards may include IEEE 802.11-1997, IEEE 802.11a-1999, IEEE 802.11b-1999, IEEE 802.11g-2003, IEEE 802.11-2007, IEEE 802.11n-2009, IEEE 802.11-2012, 802.11ac, 802.11ad, 802.11ah, and so forth.

Because of a variety of factors, including the convenience WLANs afford in terms of device portability, advances in technology, and the lower cost due to the relatively relaxed regulatory environment in which they operate, physical distribution of WLAN access points ("access points") has flourished. Various individuals or entities ranging from apartment renters to business owners may operate these access points. In many areas, ranging from rural towns to dense urban environments, WLAN access points may be detected and accessible to user devices. These access points include radio equipment used to communicate with the user devices. Individual or small groups of these access points may be operated by different entities, such as the access points owned and operated by different neighbors in a neighborhood or businesses next door to one another. Each of these access points has a relatively short range, such as on the order of 200 meters or less in typical conditions. However, given the sheer number of access points deployed, overall coverage across large geographic areas is extensive.

The entities operating these access points may implement various forms of security and access restrictions to prevent passers-by from unauthorized use of their access point. For example, a homeowner with a single access point coupled to their internet connection may require a password and particular encryption settings which are necessary to use the access point for communication to the internet. A travelling user, such as a person visiting various homes and businesses during travel, may have to ask many different parties for their respective passwords or other access information in order to use the access points and networks at these various locations. This process is cumbersome, time consuming, and is generally limited to individuals which the travelling user already has a relationship with, such as friends, family, business acquaintances, and so forth. While the traveling user may access WWAN networks such as 3G or 4G, the resulting connectivity may have various drawbacks such as being relatively expensive, providing slower data transfer rates, and so forth. Furthermore, some user devices may lack support for WWANs, eliminating even this possibility.

Described in this disclosure are systems and techniques for forming one or more cooperative networks from access points maintained by many different entities. These entities may include individuals, businesses, or other organizations. By operating in a coordinated and cooperative fashion, the ubiquitous coverage afforded by many access points is merged into a cohesive structure in which users benefit from broad geographic coverage.

A given geographic area may have one or more datacenters. The datacenters may be coupled to one another using high-capacity data connections (or "pipes"). Within the datacenters are one or more cooperative network servers. These servers are configured to use account data and usage data to establish communication with and between access points operated by different entities. These servers provide control over the cooperative network, and may mitigate or eliminate various issues such as "free riders", users which provide excessive use, undesirable network traffic, and so forth.

Access points participating in the cooperative network are associated with an account described by account data. The account may include rights to use the access points in the cooperative network to access the internet or other networks. Participation may involve the exchange of services, remuneration, or other programs designed to incentivize individual entities to participate in the cooperative network and allow others to use their access point(s). The remuneration may be for currency, points, virtual currency, and so forth. In one implementation, participation may be based on a reciprocal arrangement. For example, user devices associated with a particular account may transfer as much data using other access points up to a limit equal to the amount of data transferred by access points associated with the particular account and provided to other accounts. In other words, an account may use as much data as provided to others. In another implementation, participants may pay for access to the cooperative network.

The server may acquire usage data which provides information indicative of the usage of the access points and user devices associated with the account. Based on the account data and the usage data, the server may determine whether to provide transport of data associated with a particular account. For example, the usage data may be used to support the incentive program described above.

Data which requires transport beyond the datacenter local to an originating access point may be passed along the pipe and may exit from another datacenter to a destination address. Use of this pipe may reduce data transfer costs, reduce latency in data transfer, and so forth. For example, data may be sent by a first user device to a first access point in a first city which sends the data using an internet connection to a first datacenter in the first city. Continuing the example, based on a destination address, the data may be forwarded, using the pipe, to a second datacenter in a second city which in turn sends the data to a second access point which provides the data to a second user device.

A user interface may be provided which allows users to control participation in the cooperative network. The user interface may support the addition or removal of access points, allow for setting limitations such as how much bandwidth to provide to accounts in the cooperative network, enable acceptance of commitments to provide minimum bandwidth, and so forth.

Users having an account in the cooperative network may configure their user device to use the access points to access network resources, such as the internet. The cooperative network thus maintains connectivity for the user device while the user device moves from one access point to another. While the account complies with the incentive program as specified in the account data and indicated by the usage data, use of the cooperative network is allowed.

Illustrative System

FIG. 1A is an illustrative system 100 for providing cooperative network access. Depicted are a plurality of user devices 102(1), 102(2), . . . , 102(D). The user devices 102 may include televisions, tablet computers, personal computers, electronic book readers, gaming consoles, set-top boxes, media players, in-vehicle entertainment systems, smartphones, desktop computers, and so forth. The user devices 102 include a wireless interface configured to support wireless data communications. In one implementation, the wireless interface may support communications compliant with at least a portion of the IEEE standard 802.11 standard, also known as "Wi-Fi™". The user devices 102 may be fixed, semi-portable, or portable devices. Users may utilize these user devices 102 in a variety of different locations, such as in residential homes and apartments, in businesses, or other venues.

Also depicted are a plurality of access points 104(1), 104(2), . . . , 104(A). These access points 104 may include wireless interfaces which are compatible with those in the user devices 102, allowing for intercommunication between the two. For example, the user devices 102 and the access points 104 may both support the IEEE standard 802.11n. The access points 104 may be configured such that they provide wireless local area network ("WLAN") connectivity which provides relatively short range geographic coverage. The access points 104 may be fixed, semi-portable, or portable devices. For example, a smartphone may act as an access point or "hotspot". In another example, the access point 104 may be fixed, such as mounted inside the office of a business, and may provide a working communication range 106 with user devices 102 of up to 100 meters. The access point 104 is coupled to one or more networks 108. These networks 108 may include a hardwired local area network, neighborhood network, carrier data network such as provided by a local telecommunication carrier, and so forth. These networks 108 may be wired or wireless and connect the access point 104, the local area network to which the access point 104 is connected, or to another network or network segment. For example, the network 108 may utilize a wireless technology compliant with at least a portion of the IEEE 802.6 standard of distributed-queue dual-bus metropolitan area network. The network 108 may include private networks, public networks, or a combination thereof, such as the internet.

The user device 102 may include a cooperative participant module 110. The cooperative participant module 110 is configured to support transfer of data 112 using the cooperative network, which may be made up of one or more of the networks 108, the access points 104, and so forth. This may include providing account authorization information, establishing communication with participating access points 104, encrypting data, and so forth. The access points 104 are considered to participate in the cooperative network when they provide the functionality of a cooperative access point module 114 and are coupled to the network 108.

The cooperative access point module 114 executing on the access point 104 may provide one or more functions. One function is providing an identifier associated with the cooperative network. For example, the access point 104 may be configured to broadcast a first service set identification ("SSID") for the user's private network of "mybusiness" and a second SSID for "coop" which is associated with the cooperative network. Another function of the cooperative access point module 114 may be to monitor usage of the cooperative network through that access point 104 and generate network statistics. In some implementations, the functionality of the cooperative access point module 114 may be provided by various portions of an application or operating system executing on the access point 104.

The cooperative access point module 114 may be in communication with one or more datacenters 116 which host one or more cooperative network servers 118. The datacenters 116 may range in size and scope from an equipment rack located in a neighborhood enclosure to an extensive facility which houses thousands of servers. Each datacenter 116 exists at a particular geographic location, such as a street address or set of coordinates expressed as latitude and longitude.

The cooperative access point module 114 may be configured to route data 112 between the user device 102 which connects to the wireless interface of the access point 104 and the cooperative network server 118. The cooperative network server 118 may, in turn, route the data 112 to a destination address. This routing may be contingent upon one or more conditions of an account associated with the user device 102.

The cooperative access point module 114, in conjunction with the cooperative participant module 110, may be configured to "hand off" or transfer connectivity between access points 104 as the user device 102 moves. For example, the user device 102(1) may start out in communication range 106 of the access point 104(1), and then move away from that access point and into the communication range 106 of the access point 104(2). The cooperative access point module 114(2) may then provide the user device 102(1) with access to the cooperative network.

The cooperative access point module 114 may also be configured to enforce use of bandwidth. For example, the user may have committed to provide 200 kbps of bandwidth to the cooperative network for access by other users. The cooperative access point module 114 may reserve this committed bandwidth, preventing the user operating the cooperative access point module 114 from using that 200 kbps of reserved bandwidth.

The cooperative access point module 114 may also monitor and store statistics associated with data transfer. These statistics may be provided to the cooperative network server 118 for uses, including, but not limited to, routing determinations.

The cooperative network server 118 may include a cooperative maintenance module 120. The cooperative maintenance module 120 may be configured to handle administration and coordination of the access points 104 which have been joined to the cooperative network. This administration may include distributing configuration information to the access points 104, maintaining and retrieving network statistics associated with the access points 104, managing incentive program details, and so forth.

The cooperative maintenance module 120 is configured to determine whether the user device 102 is allowed to use the cooperative network. When use of the cooperative network is allowed, a cooperative routing module 122 may handle the routing of the data 112. For example, the cooperative routing module 122 at the datacenter 116(1) may determine that a destination address for the data 112 is located in another city, and may use the pipe to the datacenter 116(2) to transfer the data 112. In some implementations the routing may be based at least in part on information indicating one or more particular segments of the cooperative network are to be used. For example, the cooperative participant module 110 may code the data 112 to be transferred using the "High Security" segment.

The cooperative maintenance module 120 maintains the cooperative network based at least in part on account data 124. The account data 124 may include information about one or more access points 104, such as geographic location (or "geolocation"), capabilities supported by the access points 104, an account identifier is associated with those access points 104, and may also include information about a particular incentive program associated with that account. The account data 124 is discussed in more detail below with regard to FIG. 2.

The cooperative maintenance module 120 may also maintain usage data 126. The usage data 126 provides information about usage by user devices 102 associated with the particular account, quantities of data 112 transferred by access points 104 associated with the accounts, and so forth. For example, the usage data 126 may indicate that user devices 102 associated with a particular account have transferred 1.2 GB of data 112 in the current period, while the access points 104 associated with that account have provided 3.1 GB of data 112 to other accounts in that same period.

The cooperative maintenance module 120 may use the account data 124 and the usage data 126 to determine whether to provide services to a particular user device 102. For example, the user device 102(1) may have the cooperative participant module 110(1). The cooperative participant module 110(1) establishes a connection with an available access point 104, in this illustration access point 104(1). Using the network 108 connection provided by the access point 104(1), a request for data transfer services may be made to the cooperative network server 118(1) located in the local data center 116(1). The cooperative maintenance module 120 of the cooperative network server 118(1) accesses the account data 124 and the usage data 126 and determines if data transfer is permitted.

In this example, the account is setup on a reciprocal basis such that data 112 transferred on behalf of the account must be equal to or less than data transferred for other accounts by the access points 104 associated with this account. With a determination that data transfer is permitted, the cooperative maintenance module 120 calls for the cooperative routing module 122 to move the data 112 to the destination address. Continuing the example, the destination address is user device 102(4) which is currently connected to access point 104(4) in another location. The cooperative network server 118(1) sends the data 112 using the high-capacity pipe to the datacenter 116(2) closest to the access point 104(4). The cooperative routing module 122(2) on the cooperative network server 118(2) in the datacenter 116(2) receives the data 112, and sends it using the network 108(2) to the access point 104(4), which in turn wirelessly sends the data 112 to the user device 102(4).

As a result, by using the various access points 104 operated by many independent entities and combined with the administrative capabilities of the cooperative network servers 118, a cooperative network is formed from many individual access points 104. Users participating in the cooperative network may move about with their user devices 102, receiving access to the networks 108 at locations far beyond the few hundred meters provided by their own wireless access points 104.

The cooperative network may comprise one or more segments. These segments may be physical, virtual, logical, or a combination thereof. Different segments may route, process, or otherwise handle data transiting those segments differently. For example, a "High Security" segment may route traffic within highly secure backbone links, maintain end-to-end encryption, avoid or mandate transmission links traversing particular geopolitical boundaries, and so forth. In another implementation a "Green" segment may be configured to use datacenters 116, transmission links, and such to attempt to reduce overall energy consumption associated with the data transfer service. One or more of users, administrators of the access points 104, system administrators of the cooperative network, may define the segments. For example, system administrators may disallow access points 104 which have known security flaws from participating in the "High Security" segment, but may allow use of those same access points 104 in the "Green" segment.

Figure 1B:
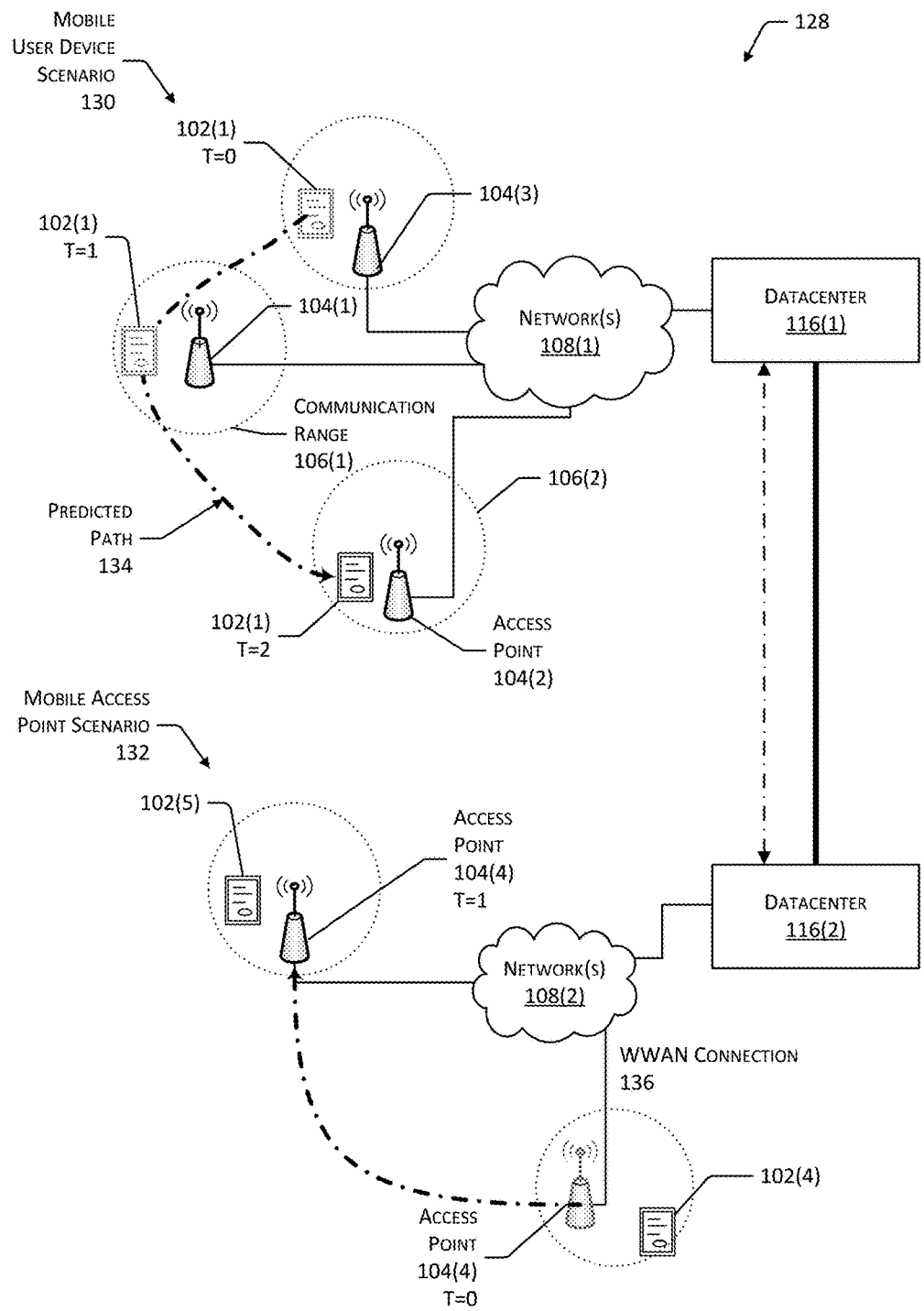
FIG. 1B illustrates the system within which the user devices, the access points, or both may be mobile.

FIG. 1B illustrates the system 128 within which the user devices 102, the access points 104, or both may be mobile and change physical locations. In this illustration, two scenarios are depicted: a mobile user device scenario 130 and a mobile access point scenario 132.

In the mobile user device scenario 130, the user device 102(1) is in motion from one physical location to another. The motion may be detected based on signal strength received from the access points 104, positioning system data, accelerometer data, and so forth. One or more modules in the system 100 may use the motion to determine a predicted path 134. For example, the cooperative maintenance module 120 may be configured to use the motion information about the user device 102 to generate the predicted path 134. The predicated path 134 may be used to coordinate the activity of one or more of the cooperative maintenance module 120, the cooperative routing module 122, the cooperative participant module 110, or the cooperative access point module 114. The cooperative participant module 110 may be provided with the SSIDs or other settings or credentials needed for use of access points 104 along the predicted path 134, before coming into the communication range 106 of those access points 104. For example, shortly after starting in motion at T=0, the user device 102(1) may receive the settings or credentials for the access point 104(1) such that, at T=1 when the user device 102(1) is in communication range 106(1) of the access point 104(1), communication may be established or maintained.

Likewise, the mobile access point scenario 132 depicts the situation in which the access point 104 moves from one physical location to another. The access point 104 may use a wireless wide area connection ("WWAN") 136, metropolitan area network ("MAN"), and so forth to maintain connectivity with the network 108. In this illustration, the access point 104(4) moves, while the user devices 102(4) and 102(5) remain stationary. In some implementations both the user devices 102 and the access points 104 with the mesh network may, over time, be in motion relative to one another.

FIG. 2 is a diagram 200 of the account data 124. The account data 124 may include one or more attributes or fields providing information about accounts participating in the cooperative network. While the account data 124 is depicted here as a table, the information may be stored in other data structures such as linked lists, key-value pairs, and so forth.

In the implementation illustrated here, the account data 124 may include an account identifier ("account ID") 202. The account ID 202 may include one or more letters, numbers, or other symbols which are used to uniquely identify a particular account. For simplicity in this illustration, the account ID's are "Alice", "Bob", "Charlie", and "Dina".

Associated with each account may be one or more access point identifiers ("access point ID") 204. For example, the user account "Alice" may be associated with two access points 104(1) and 104(2). The access point ID 204 identifies a particular access point 104, and may be unique across the cooperative network. For example, the access point ID 204 may comprise a media access control ("MAC") address associated with one of the communication interfaces of the access point 104. In some implementations the access point ID 204 may be generated by applying a hash function to the MAC address.

The account data 124 may include geolocation 206 of the access point 104. The geolocation 206 may be determined based on one or more techniques including satellite navigation, detection of nearby access points 104 that have previously known locations, using a geolocation 206 associated with a network address on the network 108, and so forth. In other implementations other types of location data may be used, such as a relative location such as "library". Other data 208 such as protocols supported, hardware available, network statistics, availability of a particular quality of service, committed minimum bandwidth, and so forth may also be included. For example, the other data 208 may indicate that the access point 104(1) supports connections compliant with at least a part of the IEEE 802.11(N), (B), and (G) standards, provides a connection to the network 108 having throughput of less than 0.5 megabits per second (Mbps), and does not support quality of service ("Qos") handling. This data may be static, or dynamically change over time. For example, the bandwidth available to the access point 104 may change from day to day.

The account data 124 may also include information associating the particular account ID 202 with a particular incentive program 210. An incentive program 210 is a series of rules or conditions under which the account may participate in the cooperative network. In one implementation the incentive program 210 may operate in a reciprocal fashion, providing to the account services less than or equal to those provided by other users. In another implementation, the incentive program 210 may provide remuneration to the account based on usage. For example, the account "Alice" may accumulate credits, points, dollars, or other value-keeping units based on the amount of data 112 other accounts transfer using the access points 104(1) and 104(2) which are associated with the "Alice" account. Similarly, in some implementations the account may be charged for usage of the cooperative network. For example, the user account for "Evelyn" may have no access points associated, and may be charged a fee for using the cooperative network.

In other implementations, the incentive program 210 may establish a marketplace. Within this marketplace services associated with, or supporting of, the cooperative network may be bought and sold. For example, a user may offer up available bandwidth for use by others for a specified time and amount of data. Similarly, other users may contract to provide particular remuneration in return for privileges within the cooperative network, such as the ability to use the "High Security" segment. The marketplace may operate on a "real-time" or instantaneous basis, such that rates associated with access may change from moment-to-moment as supply and demand of the cooperative network resources change.

The accounts may be associated with individual end users, groups of end users such families, organizations, and so forth. For example, an organization may buy access rights to use the cooperative network, and resell those rights to others.

FIG. 3 is a diagram 300 of the usage data 126. The usage data 126 may include one or more attributes or fields providing information about usage of the cooperative network by the accounts. While the usage data 126 is depicted here as a table, the information may be stored in other data structures such as linked lists, key-value pairs, and so forth.

In some implementations, such as that depicted here, the usage data 126 may be associated with the account ID 202 described above. For the accounts, various metrics about usage of the cooperative network may be stored. A quantity of data used 302 indicates how much data 112 has been transferred by the cooperative network to and from user devices 102 associated with the account. Likewise, a quantity of data provided 304 indicates how much data 112 the access points 104 associated with the account have transferred on behalf of other accounts.

A transfer balance 306 may store data about credits, points, dollars, or other value-keeping units associated with the account. The transfer balance 306 may be affected by the data used 302, the data provided 304, value paid in or paid out, and so forth. For example, in implementations where the incentive program 210 provides remuneration to operators of the access points 104, the transfer balance 306 may record the balance resulting from the usage of those access points 104. For example, as shown here the account ID 202 "Alice" has a transfer balance of +$10.14 (indicating a surplus), while the account ID 202 "Evelyn" has a transfer balance of −$19.95 (indicating a deficit).

A flag or other data file may indicate whether data transfer is allowed 308 for the particular account. The data transfer allowed 308 may be based at least in part on one or more of the data used 302, the data provided 304, the transfer balance 306, and so forth as applied to the incentive program 210 associated with the account. For example, where the incentive program 210 calls for reciprocal behavior, the data transfer allowed 308 flag may be set to a "yes" value when the account has provided more data provided 304 than data used 302.

FIG. 4 is an illustrative user interface 400 for configuring participation in a cooperative network. In some implementations, the cooperative network server 118 or another device may provide the user interface 400. The user interface 400 may be presented using, at least in part, a markup language such as hypertext markup language ("HTML"). For example, a web server may be configured to provide files which, when processed by a web browser application on the user device 102, provide the user interface 400. The user interface 400 may be accessible to an administrator or other responsible party who is associated with the account.

The user interface 400 may include a portion 402 configured to present information about the account such as a name of a person designated as an administrator and the account ID 202. Information 404 about the current incentive program may be provided, with controls configured to allow for selection of a particular incentive program.

The user interface 400 may also presentation information and controls 406 for managing access points 104 associated with the account 402. In some implementations the user interface 400 may be configured to accept login information associated with one or more of the access points 104 from the administrator. For example, the administrator may enter a login account name and password associated with a particular access point 104. The cooperative maintenance module 120 may use this information to make configuration changes to the access points 104 to support the cooperative network. For example, the cooperative maintenance module 120 may use the account name and password to upload a configuration file to the access point 104.

The user interface 400 may include controls for enabling or disabling support of QoS operation 408. Other controls for setting private SSIDs 410 may also be presented. A private SSID is an SSID associated with a network other than the cooperative network. For example, the access point 104 may be configured to support multiple simultaneous SSIDs, such as a first SSID associated with the cooperative network and a second SSID associated with the private network. The access point 104 may be configured such that data associated with the private SSID is segregated from data which is on non-private SSIDs.

The administrator may use the user interface 400 to set time of day restrictions 412. For example, the administrator may choose to give priority to data on the private network, or disallow entirely participation in the cooperative network, during business hours. A control may also be available to set day of week restrictions 414 associated with the cooperative network. For example, participation in the cooperative network may be enabled only on weekends.

The administrator may see information and controls 416 associated with committing bandwidth to the cooperative network. For example, in this illustration the administrator is currently committed to providing 500 kbps of bandwidth to users of the cooperative network. This commitment may be static or dynamically variable. For example, the administrator may choose to commit to provide more capacity. These commitments may be expressed in the form of contracts with other users, an entity operating the cooperative network, and so forth. The cooperative network may thus provide a marketplace in which users and administrators may bid for use of the cooperative market, offer services, contract to provide or use services, and so forth. This commitment may then be used to modify the settings on the access point 104. For example, based on the agreement to commit to providing a certain amount of bandwidth for a specified period, configuration data representative of this commitment may be provided to the user device 102. The user device 102 may receive this configuration data and modify operation of the access point 104 accordingly, implementing the commitment. The commitment may include a promise or contract to provide a service.

A control may also be provided allowing the administrator to determine how much available bandwidth to provide for users 418 of the cooperative network. This may be bandwidth available in excess of bandwidth commitments, such as described above. For example, the control may comprise a slider allowing the administrator to indicate 0% (no participation) or allow up to 100% of the excess bandwidth available above the commitment level to be used by cooperative network users.

As described above, the cooperative network may be divided into one or more segments based on logical, physical, functional, or other characteristics. The user interface may present information 420 indicative of the segments supported by the access points 104 under the control of the administrator 402. For example, as shown here, the access points 104 support the "High Security" segment of the cooperative network providing enhanced security services to traffic in that segment.

The controls described above may be applied to individual access points 104, to all access points 104 associated with a particular account, or a subset thereof. For example, the administrator may apply time of day restrictions 412 to some access points 104 and not others.

In some implementations the incentive program 210 may impose constraints on one or more of the controls described above. For example, a particular incentive program 210 may disable the administrator's ability to set day of week restrictions 414. Similarly, the incentive program 210 may be based at least in part on how the controls are configured. For example, an administrator who provides cooperative network access during peak usage times such as lunch time may receive a premium or enhanced incentive compared to providing access at off-peak times such as midnight.

Figure 5:
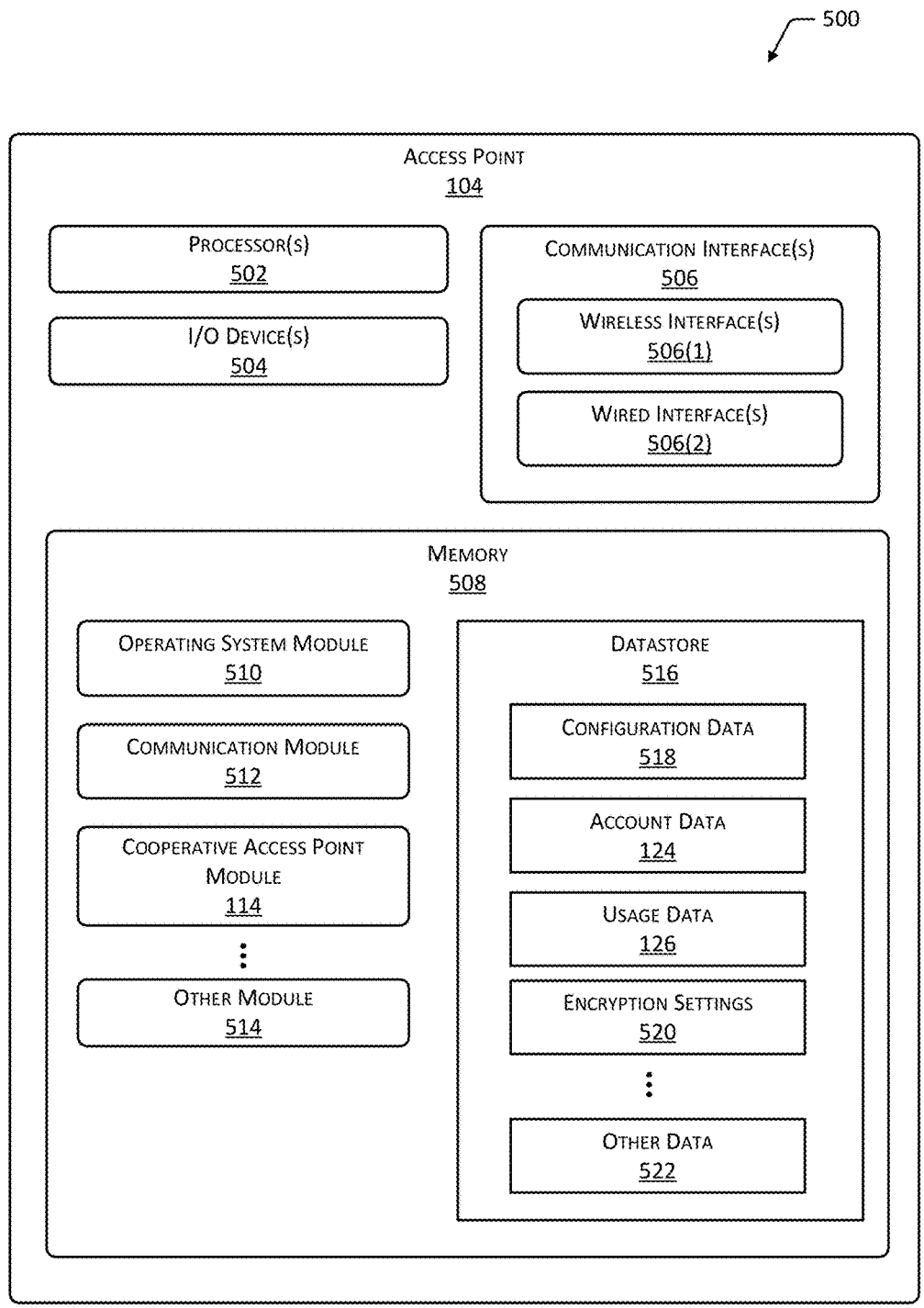
FIG. 5 is a block diagram of an access point configured to support cooperative network access.

FIG. 5 is a block diagram 500 of the access point 104 configured to support cooperative network access in the system 100. In some implementations the access point 104 may be provided in a form factor such as a mobile device, portable electronic device, built-in unit, and so forth. For example, the access point 104 may be provided by the user device 102.

The access point 104 may include one or more processors 502 configured to execute one or more stored instructions. The processors 502 may comprise one or more cores. The processors 502 may couple to one or more I/O devices 504. The I/O devices 504 may include buttons, indicator lights, displays, and so forth. The I/O devices 504 may be physically incorporated with the access point 104 or may be externally placed. The access point 104 may also include one or more busses or other internal communications hardware or software that allow for the transfer of data 112 between the various modules and components of the access point 104.

The access point 104 may include one or more communication interfaces 506 to allow the processor 502 or other portions of the access point 104 to communicate with other devices. The communication interfaces 506 may comprise one or more wireless interfaces 506(1), one or more wired interfaces 506(2), or both. The wireless interface 506(1) is configured to allow for wireless communication using acoustic, optical, radio frequency, magnetic, or other signals. For example, the wireless interface 506(1) may be configured to comply with at least a portion of the IEEE 802.11 standard, also known as "Wi-Fi™". In some implementations the wireless interface 506(1) may be configured to couple to the network 108. For example, the wireless interface 506(1) may couple to the network 108 which uses a standard compliant with at least a portion of the IEEE 802.6 standard of distributed-queue dual-bus metropolitan area network.

The wired interface 506(2) is configured to transfer data using an electrical conductor, optical waveguide, and so forth. For example, the wired interface 506(2) may be configured to comply with at least a portion of the IEEE 802.3 Ethernet standard. In some implementations, the wired interface 506(2) may be configured to connect to the network 108(1).

The access point 104 may be configured to act as a router, bridge, gateway, or relay between one or more of the wireless interfaces 506(1), one or more of the wired interfaces 506(2), or between one or more wireless interfaces 506(1) and one or more wired interfaces. For example, the access point 104 may receive data 112 from the wireless interface 506(1) and pass it along to the wired interface 506(2), and vice versa.

In another implementation, the wired interface 506(2) may be omitted, and traffic may be relayed between access points 104 using the wireless interface 506(1). For example, the access point 104(7) may be deployed within the communication range 106 of another access point 104(6), and act as a repeater or relay for the access point 104(7).

The access point 104 includes one or more memories 508. The memory 508 comprises one or more computer-readable storage media ("CRSM"). The CRSM may be any one or more of an electronic storage medium, a magnetic storage medium, an optical storage medium, a quantum storage medium, a mechanical computer storage medium and so forth. The memory 508 provides storage of computer readable instructions, data structures, program modules, and other data for the operation of the access point 104.

The memory 508 may include at least one operating system ("OS") module 510. The OS module 510 is configured to manage hardware resource devices such as the I/O devices 504, the communication interfaces 506, and provide various services to applications or modules executing on the processors 502. Also stored in the memory 508 may be one or more of the following modules. These modules may be executed as foreground applications, background tasks, daemons, and so forth.

A communication module 512 is configured to maintain communication between devices such as the user devices 102 and the cooperative network servers 118. For example, the communication module 512 may implement a transmission control protocol/internet protocol ("TCP/IP") stack.

The access point 104 may include the cooperative access point module 114. As described above, the cooperative access point module 114 may provide various functions. One function may include receiving configuration data from the cooperative network server 118 and implementing that configuration on the access point. Other functions may include providing encryption settings or credentials to the user devices 102, routing traffic, establishing a firewall between the data 112 of the cooperative network and any private network running on the access point 104, and so forth.

The access point 104 may include other modules 514 as well. For example, a network monitoring module may be configured to generate network usage statistics associated with one or more of the communication interfaces 506, and provide that information to the cooperative access point module 114.

The memory 508 may also include a datastore 516 to store information. The datastore 516 may use a flat file, database, linked list, tree, or other data structure to store the information. In some implementations, the datastore 516 or a portion of the datastore 516, may be distributed across one or more other devices including servers, network attached storage devices, and so forth.

The datastore 516 may store configuration data 518 associated with operation of the access point 104. The configuration data 518 may include SSIDs, QoS settings, and so forth. In some implementations at least a portion of the configuration data 518 may be received from the cooperative network server 118 or another device configured to remotely configure the access point 104. In some implementations the datastore 516 may include at least a portion of one or more of account data 124 or usage data 126. The datastore 516 may also store encryption settings 520, such as public keys for distribution to and use by the user devices 102 participating in the cooperative network. Other data 522 may also be stored in the datastore, such as the MAC address of the communication interfaces 506, list of network addresses provided by a dynamic host configuration protocol ("DHCP") module, and so forth.

Figure 6:
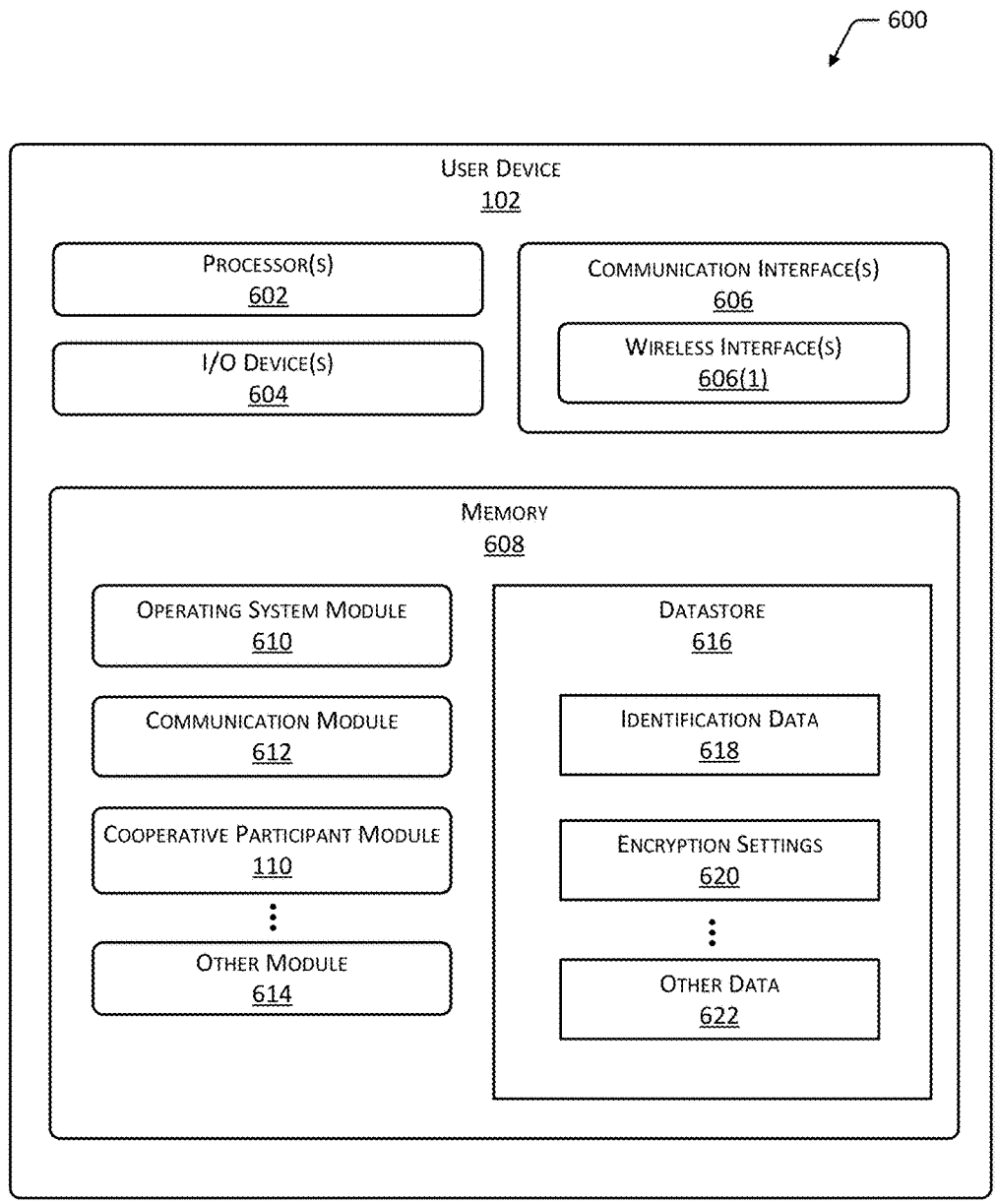
FIG. 6 is a block diagram of a user device configured to access the cooperative network.

FIG. 6 is a block diagram 600 of the user device 102 configured to access the cooperative network. The user device 102 may include one or more processors 602 configured to execute one or more stored instructions. The processors 602 may comprise one or more cores. The user device 102 may include one or more I/O devices 604. The I/O devices 604 may include microphones, touch sensors, buttons, keypads, displays, speakers, haptic output devices, and so forth. The I/O devices 604 may be physically incorporated with the user device 102 or may be externally placed. The user device 102 may also include one or more busses or other internal communications hardware or software that allow for the transfer of data between the various modules and components of the user device 102.

The user device 102 may include one or more communication interfaces 606 to allow the processor 602 or other portions of the user device 102 to communicate with other devices, such as the access points 104. The communication interfaces 606 may be similar to those described above with respect to the communication interfaces 506 described above in FIG. 5. For example, the communication interface 606 may include a wireless interface 606(1) compliant with at least a portion of the IEEE 802.11 standard.

The user device 102 includes one or more memories 608. The memory 608 comprises one or more CRSM as described above. The memory 608 provides storage of computer readable instructions, data structures, program modules, and other data for the operation of the user device 102.

The memory 608 may include at least one OS module 610. The OS module 610 is configured to manage hardware resource devices such as the I/O devices 604, the communication interfaces 606, and provide various services to applications or modules executing on the processors 602. Also stored in the memory 608 may be one or more of the following modules. These modules may be executed as foreground applications, background tasks, daemons, and so forth.

A communication module 612 is configured to maintain communication between devices, such as the access points 104 and the cooperative network servers 118. For example, the communication module 612 may implement a TCP/IP stack. Other functions may also be provided, such as providing encryption to the data 112 transferred using secure socket layer ("SSL"), transport layer security ("TLS"), virtual private networks ("VPN"), and so forth.

The memory 608 may also store the cooperative participant module 110. As described above, the cooperative participant module 110 is configured to support transfer of data 112 using the cooperative network. This may include providing account authorization information, establishing communication with participating access points 104, encrypting data, and so forth.

In some implementations the cooperative participant module 110 may be configured to provide information to the user. This information may be indicative of particular geolocations which are associated with access to the cooperative network. For example, the user may see presented on the display of the user device 102 a prompt indicating that "if you move north 50 feet, you should be in range of the cooperative network". In this way, the user may be directed to locales in which the cooperative network is available.

The cooperative participant module 110 may also be configured to implement one or more techniques to improve security of the connection. For example, the cooperative participant module 110 may request a secure sockets layer (SSL) certificate or transport layer security (TLS) certificate by using a plurality of routes through the cooperative network. Once received, the copies of the certificate, which arrived by way of the different routes may be compared to determine if one differs from the other. A comparison indicating the 2 are the same may provide a high assurance that the cooperative network has not been compromised, such as in a man-in-the-middle attack. In another implementation, certificate pending may be used. The certificate pending may involve trusting a particular certificate only or trusting only certificates signed by the specified certificate.

Other modules 614 may also be present. For example, a positioning module may be configured to determine geolocation of the user device 102. The positioning module may be configured to acquire data from an I/O device 604 such as a global positioning system receiver.

The memory 608 may also include a datastore 616 to store information. The datastore 616 may use a flat file, database, linked list, tree, or other data structure to store the information. In some implementations, the datastore 616 or a portion of the datastore 616 may be distributed across one or more other devices including servers, network attached storage devices, and so forth.

Identification data 618 may be stored in the datastore 616. The identification data 618 may comprise information which is indicative of one or more of the particular user device 102, the account ID 202 of the account used to access the cooperative network, and so forth. Encryption settings 620 for use by the cooperative participant module 110, the communication module 612, or both, may also be stored. In some implementations the encryption settings 620 may be based on information received from the access point 104, the cooperative network server 118, or both.

The datastore 616 may also store other data 622. The other data 622 may include user preferences, content such as electronic books or videos, and so forth.

Figure 7:
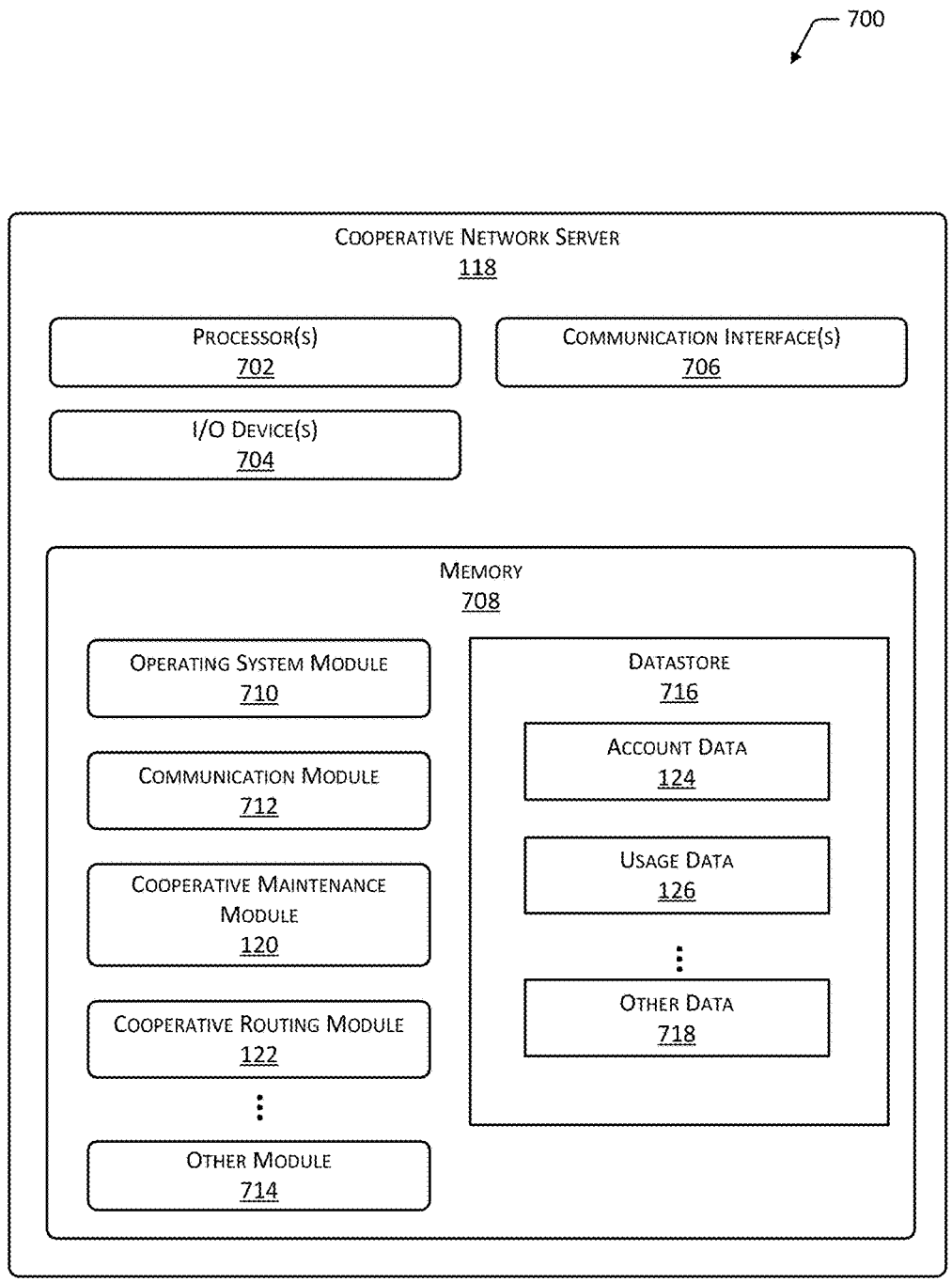
FIG. 7 is a block diagram of a cooperative network server configured to coordinate and support the cooperative network.

FIG. 7 is a block diagram 700 of the cooperative network server 118 configured to coordinate and support the cooperative network. The cooperative network server 118 may include one or more processors 702 configured to execute one or more stored instructions. The processors 702 may comprise one or more cores. The cooperative network server 118 may include one or more I/O devices 704. The I/O devices 704 may include keyboards, displays, printers, and so forth. The I/O devices 704 may be physically incorporated with the cooperative network server 118 or may be externally placed. The cooperative network server 118 may also include one or more busses or other internal communications hardware or software that allow for the transfer of data between the various modules and components of the cooperative network server 118.

One or more communication interfaces 706 allow the processor 702 or other portions of the cooperative network server 118 to communicate with other devices. The communication interfaces 706 may be those similar to those described above with respect to the communication interfaces 506 described above in FIG. 5. The communication interfaces 706 may be configured to couple to the network 108.

As shown in FIG. 7, the cooperative network server 118 includes one or more memories 708. The memory 708 comprises one or more CRSM. The memory 708 provides storage of computer readable instructions, data structures, program modules and other data for the operation of the cooperative network server 118.

The memory 708 may include at least one OS module 710. The OS module 710 is configured to manage hardware resource devices such as the I/O devices 704, the communication interfaces 706, and provide various services to applications or modules executing on the processors 702. Also stored in the memory 708 may be one or more of the following modules. These modules may be executed as foreground applications, background tasks, daemons, and so forth.

A communication module 712 is configured to maintain communication between devices such as the user devices 102, the access points 104, other cooperative network servers 118, and other devices. For example, the communication module 712 may implement a TCP/IP stack. Other functions may also be provided, such as providing encryption to the data 112 transferred using secure socket layer ("SSL"), transport layer security ("TLS"), virtual private networks ("VPN"), and so forth.

The memory 708 may also store the cooperative maintenance module 120. As described above, the cooperative maintenance module 120 may be configured to handle administration and coordination of the access points 104 which have been joined to the cooperative network. Administration may include distributing configuration information to the access points 104, maintaining and retrieving network statistics associated with the access points 104, managing incentive program details, and so forth.

The cooperative maintenance module 120 may be configured to provide different levels of anonymity to the users of the cooperative network. In one implementation traffic through the cooperative network may be tagged or otherwise designated by a unique identifier. For example, the cooperative participant module 110 may include an identification string or other value in transmissions of data sent across the cooperative network. The unique identifier may be used to track traffic associated with a particular user. In another implementation, traffic through the cooperative network may be anonymized such that the identity of the originator of the traffic is concealed. The degree of anonymity may be specified by the user, a system administrator, or another entity or organization. For example, the user may choose to allow tracking or identification of the transmissions across the cooperative network.

The cooperative maintenance module 120 is configured to determine whether an account with which the user device 102 is associated with is allowed to use the cooperative network. This determination may be based on one or more of the account data 124, the usage data 126, and so forth. For example, the cooperative maintenance module 120 may determine when data transfer is allowed 308 for the account based on the incentive program 210 of the account and the usage data 126.

The cooperative maintenance module 120 may also maintain usage data 126. The usage data 126 provides information about usage by user devices 102 associated with the particular account, quantities of data 112 transferred by access points 104 associated with the accounts, and so forth. The usage data 126 may be based on information received from the access points 104, internal reporting of data transferred by the cooperative network server 118, or from other devices such as routers.

Users may receive prompts, such as via the user interface 400, to add access points 104 to particular geolocation, based on information from the cooperative maintenance module 120. For example, the cooperative maintenance module 120 may generate information indicating that a particular geolocation such as in front of a busy shop does not provide enough bandwidth to adequately meet historical or projected demand. Based on this information, users in those geolocations may receive advertisements of particular incentive programs 210 applicable to that geolocation.

As described above with regard to FIG. 1B, one or more of the cooperative network server 118, the cooperative participant module 110, or the cooperative access point module 114 may be configured to maintain connectivity when relative motion occurs between the user devices 102 and the access points 104. For example, motion may be determined and used to provide communication credentials, SSIDs, and so forth to the cooperative participant module 110, the cooperative access point module 114, and so forth. For example, the user may be traveling with the user device 102, moving from the communication range 106 of one access point 104 to another. In another example, the user device 102 may be stationary while the access point 104, such as a portable hotspot, is in motion.

When the cooperative maintenance module 120 determines that a particular account is allowed to use the cooperative network to transfer data 112, the cooperative routing module 122 stored in the memory 708 may participate in the routing of the data 112 from a source such as the user device 102 to a destination address. The data 112 may be routed via one or more datacenters 116 and the corresponding high-capacity "pipes" or data connections which may provide interconnections between.

Other modules 714 may also be present. For example, a payment processing module may be configured to debit or credit values, such as the transfer balance 306 for accounts.

The memory 708 may also include a datastore 716 to store information. The datastore 716 may use a flat file, database, linked list, tree, or other data structure to store the information. In some implementations, the datastore 716 or a portion of the datastore 716 may be distributed across one or more other devices including servers, network attached storage devices, and so forth.

The datastore 716 may store the account data 124, the usage data 126, or other data 718. The other data 718 may include payment account details, configuration files for the modules, and so forth.

Illustrative Processes

Figure 8:
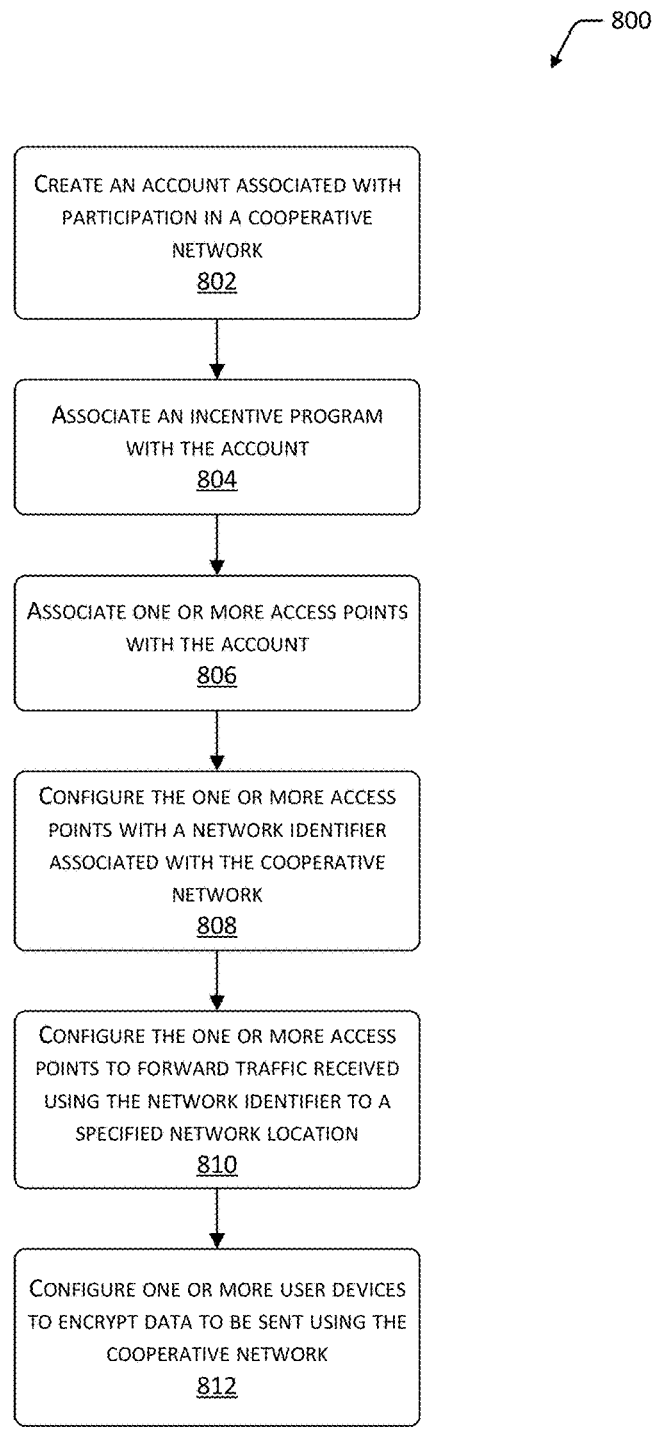
FIG. 8 is a flow diagram of a process of configuring an account and one or more access points to participate in the cooperative network.

FIG. 8 is a flow diagram 800 of a process of configuring an account and one or more access points 104 to participate in the cooperative network. In some implementations the cooperative network server 118 may implement at least a portion of the process. This process brings access points 104 into the cooperative network.

Block 802 creates an account associated with participation in a cooperative network. As described above with regard to FIG. 2, the account data 124 may describe the account. The account data 124 may associate the account with one or more access points 104, particular user credentials, particular user devices 102, and so forth. As described above, the cooperative network may comprise a plurality of access points 104 in communication with one or more devices such as the user devices 102, the cooperative network servers 118, and so forth. The plurality of access points may be operated independently by a plurality of different entities. For example, a homeowner may own the access point 104(1), while a business owns access point 104(2), and so forth. As described above, in one implementation the access points 104 are configured to establish connections compliant with at least a portion of an 802.11 standard as promulgated by the IEEE.

Block 804 associates an incentive program 210 with the account. For example, the account ID 202 of "Alice" is associated with the incentive program 210 of "R11", indicating a reciprocal incentive program.

Block 806 associates one or more access points 104 with the account. For example, an administrator may use the user interface 400 to add the access point 104(1) to the "Alice" account.

Block 808 configures the one or more access points 104 with a network identifier associated with the cooperative network. Continuing the example, the cooperative maintenance module 120 may be configured to automatically distribute and update the access point 104 to support the cooperative network's SSID of "coop".

Block 810 configures the one or more access points 104 or other devices, to forward the data 112 received to one or more specified network locations. The other devices may include servers, firewalls, routers, or other devices which are configured to interact with the data 112. The forwarding may be tied to a particular network identifier in use by the access point 104, such as the cooperative network's SSID. The one or more specified network locations may include one or more devices configured to direct the data 112 between the plurality of access points 104, such as the cooperative network servers 118, routers, firewalls, other servers, and so forth. For example, the access point 104 may be configured to route all traffic received using the SSID "coop" to the cooperative network server 118 which is nearest the access point 104. As used herein, "nearest" may indicate geographic proximity, proximity based on number of routing hops, latency, and so forth.

The configuration of the access points 104 or other devices may be manual or automated. Manual configuration may include presenting, using the user interface 400, instructions or configuration details to the administrator. Automatic configuration may include sending one or more configuration data files to the access point 104. The access point 104 may process the one or more configuration data files and update the configuration onboard the access point 104 accordingly.

Block 812 configures one or more of the user devices 102 to encrypt the data 112 prior to transport to the access point 104. The data 112 may be decrypted at the datacenter 116, the cooperative network server 118, or may remain encrypted until decrypted at an endpoint, such as a receiving user device 102, server, or other device.

Figure 9:
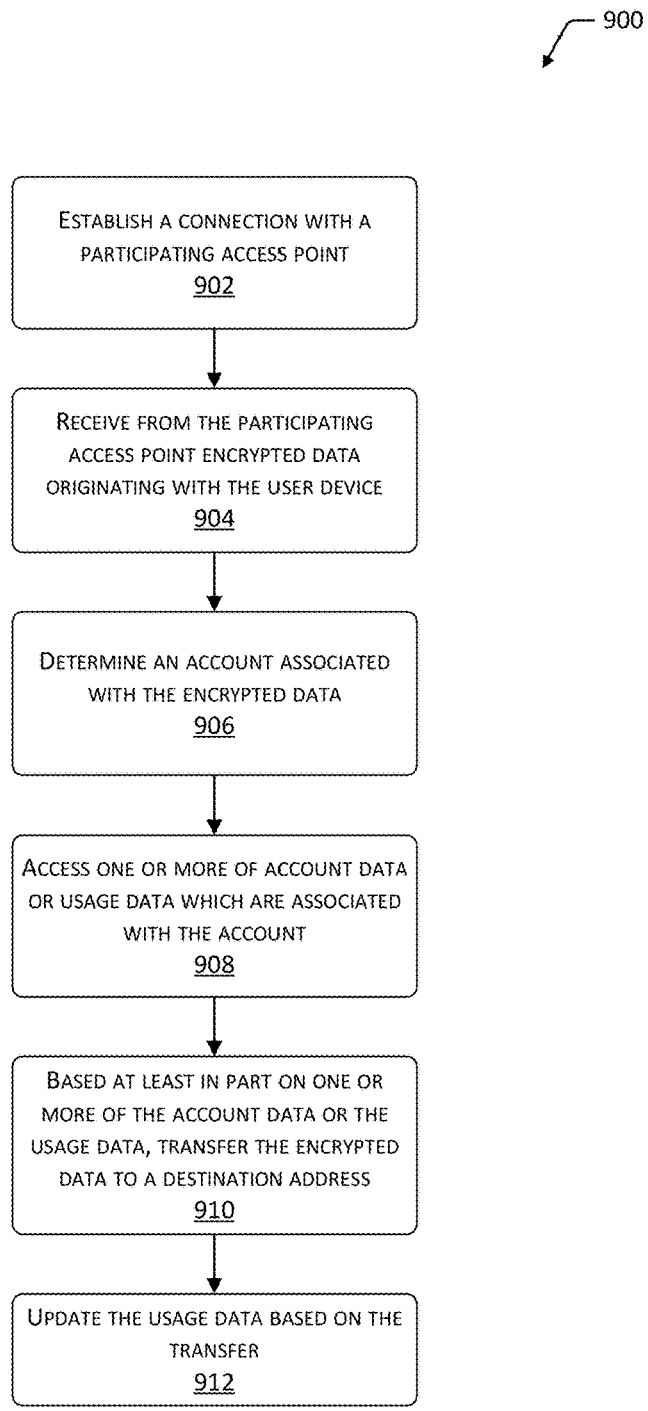
FIG. 9 is a flow diagram of a process of using the cooperative network.

FIG. 9 is a flow diagram 900 of a process of using the cooperative network. In some implementations one or more of the user device 102, the access point 104, the cooperative network server 118, or other devices may implement at least a portion of the process.

Block 902 establishes a connection with at least a portion of the one or more access points 104. For example, the cooperative maintenance module 120 may initiate a connection with the cooperative access point module 114.

Block 904 receives, at the cooperative network server 118(1) in the first datacenter 116(1), data 112 originating with an originating device. For example, the originating device may be the user device 102. The data 112 may be provided to the datacenter 116 by way of the access point 104. The access point 104 may provide wireless connectivity to the user device 102 as described above. As described above, the access point 104 may be operated by a first entity, such as "Alice". As also described above, the data 112 may comprise encrypted data, which has been encoded at the user device 102.

Block 906 determines an account associated with the data 112. For example, the cooperative network server 118 may receive identification information from the cooperative participant module 110(1) of the user device 102(1). Based on this identification information, the account ID 202 of the account may be determined.

Block 908 accesses the account data 124, the usage data 126, or both, which are associated with the account. For example, using the account ID 202, the incentive program 210, and the data transfer allowed 308 flag for the account may be retrieved.

Block 910, based at least in part on the account data 124, the usage data 126, or both, transfers the data 112 to a destination address. For example, the data transfer allowed 308 flag may indicate that transfer of the data 112 is permitted to the account.

Based on the data transfer allowed 308 flag, or other data, the cooperative routing module 122 may be directed to transfer the data 112.

The transfer may be subject to approval by the cooperative maintenance module 120 as described above. In one implementation, the data transfer allowed 308 flag may be based at least in part on the quantity of data 112 transferred on behalf of other accounts by one or more wireless access points 104 associated with the account, the quantity equaling or exceeding data 112 used by the account, and so forth.

In another implementation approval may be based at least in part on transfer balance 306 being above a threshold value, such as zero. As described the transfer balance 306 may be indicative of data transfer capacity associated with the account. The transfer balance 306 expressed as one or more of currency, points, bytes, or time. For example, the transfer balance 306 may provide for so many minutes of data transfer, association with the access point 104, and so forth.

The destination address may be designated using one or more of a user device 102 identifier, an account identifier such as the account ID 202, a uniform resource locator ("URL"), a domain name, or an internet protocol, or other network address. As described above, in some implementations the transfer may utilize the pipes between the datacenters 116. In these implementations, a second datacenter 116(2) may be used as an egress point for the data 112. Where the destination address is for another user device 102 accessible via an access point 104, the second datacenter 116(2) may send the data 112 to that access point 104 for relay to the appropriate user device 102. The second datacenter 116 may be selected based on geographic location proximate to the destination address, network proximity such as minimal number of routing hops, and so forth.

Block 912 updates the usage data 126 based on the transfer. For example, as data 112 is transferred on behalf of the account "Alice", the data used 302 for "Alice" may be increased. For example, the usage data 126 may be updated to indicate a quantity of the received data transferred to the destination address.

Those having ordinary skill in the art will readily recognize that certain steps or operations illustrated in the figures above can be eliminated or taken in an alternate order. Moreover, the methods described above may be implemented as one or more software programs for a computer system and are encoded in a computer readable storage medium as instructions executable on one or more processors.

The computer readable storage medium can be any one of an electronic storage medium, a magnetic storage medium, an optical storage medium, a quantum storage medium and so forth. Separate instances of these programs can be executed on or distributed across separate computer systems. Thus, although certain steps have been described as being performed by certain devices, software programs, processes, or entities, this need not be the case and a variety of alternative implementations will be understood by those having ordinary skill in the art.

Additionally, those having ordinary skill in the art readily recognize that the techniques described above can be utilized in a variety of devices, environments and situations.

Although the present disclosure is written with respect to specific embodiments and implementations, various changes and modifications may be suggested to one skilled in the art and it is intended that the present disclosure encompass such changes and modifications that fall within the scope of the appended claims.

What is claimed is:

1. A system, comprising:
   at least one communication interface, configured to communicate with one or more access points;
   at least one memory storing computer-executable instructions; and
   at least one processor configured to access the at least one communication interface and the at least one memory, the at least one processor configured to execute the computer-executable instructions to cause the at least one processor to:
   receive, from a plurality of access points located in a first geographic area participating in a cooperative network, a respective broadcast of a first service set identification ("SSID") for connecting to a private network associated with a respective one of the plurality of access points, and a respective second SSID associated with the cooperative network;
   establish a connection with the respective one of the plurality of access points using the respective second SSID associated with the cooperative network, the respective one of the plurality of access points located in the first geographic area being maintained by a respective one of a first plurality of entities having an account for participating in the cooperative network;
   establish a connection with a first datacenter;
   receive from one of the plurality of access points encrypted data originating with a first user device, the encrypted data including an encrypted communication for transmission to a destination address located in a second geographic area having a second datacenter in communication with the first datacenter via a high-capacity data connection;
   determine, from the respective one of the first plurality of entities participating in the cooperative network, the account associated with the encrypted data;
   access, from a datastore at the first datacenter, usage data associated with the account, the usage data indicating a first quantity of the encrypted data is less than a reciprocal quantity of other data associated with other accounts transferred during a predetermined period of time by the respective one of the plurality of access points associated with the account;
   determine an indication of one or more of a type or a category of a network segment associated with routing of the encrypted data;
   determine a subset of a plurality of participating access points in the second geographic area that correspond to the one or more of the type or the category, the subset of the plurality of participating access points in the second geographic area being maintained by a second plurality of entities participating in the cooperative network;
   based at least in part on the first quantity of the encrypted data being less than the reciprocal quantity of other data and the type or category, transfer the encrypted data to the first datacenter via the respective one of the plurality of access points located in the first geographic area, from the first datacenter to the second datacenter using the high-capacity data connection, from the second datacenter to one or more of the plurality of participating access points within the subset of the plurality of participating access points in the second geographic area, and to a second user device associated with the destination address, the second user device associated with the destination address configured to decrypt the encrypted communication; and
   update the usage data maintained by the datastore at the first datacenter based on the transfer.

2. The system of claim 1, wherein the usage data comprises data indicative of:
   data used by one or more users or user devices associated with the account; and
   data transferred on behalf of other accounts by one or more of the plurality of participating access points associated with the account.

3. The system of claim 2, further comprising computer-executable instructions to cause the at least one processor to:
   determine a first quantity of data transferred by an access point associated with one of the first plurality of entities having the account for participating in the cooperative network on behalf of one or more other accounts;
   determine a second quantity of data associated with the encrypted data; and
   determine the first quantity of data to be greater than or equal than the second quantity of data;
   wherein the transfer is permitted based on the first quantity of data equaling or exceeding the second quantity of data.

4. The system of claim 1, wherein the usage data comprises data indicative of a first portion of bandwidth for an access point associated with the one of the first plurality of entities having the account for participating in the cooperative network that is reserved for use by one or more other accounts, the system further comprising computer-executable instructions to cause the at least one processor to:
   provide the encrypted data using a second portion of the bandwidth.

5. The system of claim 1, further comprising computer-executable instructions to cause the at least one processor to:
   determine, based on movement of at least a portion of the system, a predicted path of the at least a portion of the system;
   determine at least a portion of the subset of the plurality of participating access points that corresponds to the predicted path; and
   receive one or more of settings or credentials associated with the at least a portion of the subset of the plurality of participating access points.

6. A computer-implemented method comprising:
   creating a first account associated with participation in a cooperative network;
   associating an incentive program with the first account;
   associating one or more participating access points with the first account, the one or more participating access points being maintained by a first entity associated with the first account;
   configuring the one or more participating access points associated with the first account to broadcast a first service set identification ("SSID") for connecting to a first private network associated with the first entity, and a second SSID for connecting to the cooperative network;

configuring the one or more participating access points associated with the first account to forward data received using the second SSID for connecting to the cooperative network to one or more specified network locations;

determining, based on movement of a user device associated with the first account, a predicted path of the device;

determining at least one participating access point associated with the predicted path and maintained by a second entity associated with a second account, the at least one participating access point broadcasting a third SSID for a second private network associated with the second entity, and a fourth SSID associated with the cooperative network;

configuring the device to access the at least one participating access point maintained by the second entity associated with the second account using the fourth SSID associated with the cooperative network;

receiving, from one of the one or more participating access points associated with the first account, received data originating with the user device associated with the first account;

accessing usage data associated with the first account, the usage data indicating that a quantity of data used by one or more user devices associated with the first account is less than a quantity of data transferred on behalf of other accounts by the one or more user devices; and based at least in part on the usage data, transferring the received data to a destination address via the at least one participating access point maintained by the second entity associated with the second account.

7. The method of claim 6, wherein the cooperative network comprises a plurality of participating access points in communication with one or more devices having respective accounts associated with participation in the cooperative network; and
wherein the plurality of participating access points are operated independently by a plurality of different entities.

8. The method of claim 6, wherein the one or more specified network locations comprise one or more devices configured to direct data between the one or more participating access points.

9. The method of claim 6, further comprising:
encrypting the received data at the user device, the user device in communication with a first access point of the one or more participating access points associated with the first account, wherein the received data includes an encrypted communication for transmission to the destination address; and
decrypting the encrypted communication at a device associated with the destination address, the device associated with the destination address in communication with a second access point of the one or more participating access points associated with the other accounts.

10. The method of claim 6, wherein configuring the one or more participating access points associated with the first account comprises sending one or more configuration data files, wherein the configuration data files are indicative of a commitment to provide a first portion of bandwidth of the first entity associated with the first account and the received data is transferred to the destination address using a second portion of the bandwidth of the first entity associated with the first account.

11. The method of claim 6, further comprising:
updating the usage data based on the quantity of the received data transferred to the destination address.

12. The method of claim 6, wherein the receiving of the received data occurs at a first of the one or more participating access points;
the first of the one or more participating access points provides the received data to a first datacenter located at a first geographic location, the first datacenter being in communication via a high-capacity data connection with a second datacenter at a second geographic location proximate to the destination address;
transferring the received data comprises sending the received data via the high-capacity data connection to the second datacenter at the second geographic location; and
the second datacenter provides the received data to the at least one participating access point associated with the destination address and maintained by the second entity associated with the second account.

13. The method of claim 6, further comprising:
determining an indication of one or more of a type or a category of the network segment associated with routing of the data;
determining a set of access points that correspond to the one or more of the type or category of the network segment; and
determining that the at least one access point is included in the set of access points.

14. A computer-implemented method comprising:
receiving at a first datacenter, from a wireless access point in a first geographic location participating in a cooperative network and operated by a first entity, a first quantity of data originating with an originating device, wherein the wireless access point broadcasts a first service set identification ("SSID") for connecting to a private network associated with the first entity, and a second SSID for connecting to the cooperative network and wherein the first datacenter is in communication with a second datacenter via a high-capacity data connection;
determining the wireless access point is associated with a first account for participating in the cooperative network for transferring the first quantity of data;
determining, based on one or more of the first quantity of data, the originating device, the first datacenter, the second datacenter, or the first account, an indication of one or more of a type or a category of a network segment associated with routing of the first quantity of data;
accessing account data and usage data associated with the first account, one or more of the account data or the usage data indicating a second quantity of data associated with the first account, the second quantity of data transferred by the wireless access point participating in the cooperative network and associated with the first account, the second quantity of data transferred on behalf of one or more other accounts accessing the wireless access point using the second SSID;
determining that the second quantity of data is greater than or equal to the first quantity of data;
based at least in part on the second quantity of data being greater than or equal to the first quantity of data, approving transfer of the data by the wireless access point associated with the first account to a destination address in communication with the second datacenter;

determining that one or more of the first datacenter, the second datacenter, or one or more access points associated with one or more of the first datacenter or the second datacenter correspond to the one or more of the type or the category of the network segment; and based at least in part on the indication of the one or more of the type or the category of the network segment, causing the data to be transferred by the wireless access point to the first datacenter, from the first datacenter to the second datacenter via the high-capacity data connection and from the second datacenter to the destination address in a second geographic location using a second access point maintained by a second entity having a second account for participating in the cooperative network.

15. The method of claim 14, wherein the second datacenter sends the data to the second access point operated by the second entity, wherein the second access point is in communication with the destination address.

16. The method of claim 14, wherein:

the usage data comprises a transfer balance;

the approving is based on the transfer balance; and the transfer balance is indicative of data transfer capacity associated with the first account, the transfer balance expressed as one or more of currency, points, bytes, or time.

17. The method of claim 14, wherein the data includes an encrypted communication that is encrypted by the originating device and decrypted by a device at the destination address.

18. The method of claim 14, further comprising:

determining, based at least in part on the account data, an incentive program associated with the first account, the incentive program indicating a quantity of data; and determining correspondence between the quantity of data and the usage data;

wherein causing the data to be transferred is performed responsive to the correspondence between the quantity of data and the usage data.

19. The method of claim 14, further comprising:

determining, based on one or more of the account data or the usage data, a commitment to provide a first portion of bandwidth associated with the first account for use by one or more other accounts;

wherein the data is transferred using a second portion of the bandwidth associated with the first account.

20. The method of claim 14, further comprising:

determining movement of the originating device;

determining a predicted path of the originating device based on the movement;

determining one or more access points that correspond to the predicted path; and configuring the originating device to access the one or more access points that correspond to the predicted path;

wherein receiving the first quantity of data at the first datacenter includes receiving the data via at least a subset of the one or more access points that correspond to the predicted path.

* * * * *